Patented Mar. 7, 1950

2,499,486

UNITED STATES PATENT OFFICE 2,499,486

FILM AND COMPOSITION THEREFOR

Edward D. Fuller, Chicago, Ill., assignor to The Visking Corporation, Chicago, Ill., a corporation of Virginia No Drawing. Application May 22, 1948, Serial No. 28,749

4 Claims. (Cl. 260—28.5)

This invention relates to films and compositions for the preparation thereof. More particularly, it relates to new and improved polyethylene films and compositions therefor.

United States Patent Nos. 2,153,553, 2,188,465, and 2,200,429 disclose a solid polymer consisting of polymerized ethylene. Such polymer is known as "polyethylene" or "polythene." An outstanding property thereof is its chemical inertness upon contact with inorganic acids and alkalies either in the cold or at 80° C. to 90° C. Such polymer is insoluble in many solvents, such as water, ethanol, amyl, alcohol, ethyl ether, acetone, chloroform, and glycerine. It is also incompatible with drying oils, such as linseed oil and with nitro cellulose.

Recently, there has been devised a process wherein polyethylene is extruded from a melt to form a thin wall seamless tubing which is collected in a flattened state on a reel. Because of the aforementioned properties and other properties of polyethylene, such tubing is admirably suitable for use as a packaging material such as, for example, envelopes, bags, pouches, etc. Similarly, self-sustaining sheeting of polyethylene is also admirably suitable for packaging and wrapping purposes.

Self-sustaining polyethylene film, either in the form of seamless tubing or sheeting, is characterized by a hazy or cloudy apperance. Attempts have been made to improve the clarity of such polyethylene film, but up to the present invention, such attempts have been unsuccessful.

An object of this invention is to provide a new and improved polyethylene composition.

Another object of this invention is to provide a polyethylene composition for producing film of improved clarity.

A further object of this invention is to provide self-sustaining polyethylene film of improved clarity.

Other and additional objects will become apparent hereinafter.

The above objects are accomplished in general by providing a composition consisting essentially of polyethylene compounded with di-2 ethyl hexyl phthalate and carnauba wax and forming a self-sustaining film by extruding such composition in the molten state through a die of appropriate shape.

In one embodiment of the invention, the compounded composition is molten and dry-extruded through an annular die to form a seamless tubing, and as the tubing is being drawn from the die while it is in the plastic formative state, the tubing is inflated to a predetermined diameter and the expanded tubing is set at approximately the point where said tubing has reached the desired diameter. After setting, the tubing is collapsed and wound up in the flattened state on a reel. When sheeting is desired, the flattened tubing is longitudinally severed adjacent to one or both of its longitudinal edges.

The procedure of preparing the composition is important. To obtain optimum results, the polyethylene must be compounded with both di-2 ethyl hexyl phthalate and the carnauba wax. In the preferred embodiment of the invention, the polyethylene and the di-2 ethyl hexyl phthalate and carnauba wax are formed into a substantially homogenous mixture by compounding on a conventional rubber mill or in the well-known Banbury mixer. It is to be noted that the compounding is effected while the polyethylene is in a heated plastic state at or above its melting point. With polyethylene having a molecular weight of from 18,000 to 22,000 the compounding is effected at a temperature within the range of 240° F. to 325° F. In practice, the polyethylene is applied to the rubber mill or introduced into the Banbury mixer, and when it has been heated to at least its melting point and become plastic, the di-2 ethyl hexyl phthalate is added gradually. Upon completion of the addition of the di-2 ethyl hexyl phthalate, the carnauba wax is added gradually. Operation of the mill or mixer is not interrupted while the additives are added and after the additions have been made is continued until a homogenous composition is obtained. The compounded composition is removed from the mill or mixer and permitted to cool, after which it is sub-divided, as by grinding, into pellets of any appropriate size, such as $\frac{1}{4}$", $\frac{3}{16}$", and $\frac{3}{8}$" in diameter.

The addition of the di-2 ethyl hexyl phthalate and the carnauba wax need not be made in the sequence previously described. Either the di-2 ethyl hexyl phthalate or the carnauba wax may be added first to the polyethylene on the mill or in the mixer. Alternately, both may be added simultaneously. Irrespective of the sequence of the addition of the di-2 ethyl hexyl phthalate, the additions should be made slowly and gradually.

The proportions of the components of the compounded composition are important. Too great a quantity of di-2 ethyl hexyl phthalate will produce a film with a greasy feel, while too small a quantity will not improve the clarity of the film. Too great a quantity of carnauba wax will result in a film having a yellow haze and blooming, while too small a quantity will not cooperate with the di-2 ethyl hexyl phthalate to give desired improvement in clarity. In general, the proportions of the ingredients of the compounded composition required to give the improvement in clarity are as follows:

| | Parts (by weight) |
|---|---|
| Polyethylene | 100 |
| Di-2 ethyl hexyl phthalate | ½ to 2 |
| Carnauba wax | ½ to 3 |

The preferred compounded composition consists essentially of the following ingredients in the following proportions:

| | Parts (by weight) |
|---|---|
| Polyethylene | 100 |
| Carnauba wax | 2 |
| Di-2 ethyl hexyl phthalate | 2 |

Preferably, the polyethylene has a molecular weight of 18,000 to 22,000. The di-2 ethyl hexyl phthalate is the pure grade and the carnauba wax is preferably No. 1 yellow double refined.

The invention is particularly suitable for the production of film of a thickness of from .0005 to .005 inch. The film may be in the form of continuous tubing or sheeting.

Film produced by dry extruding the molten compounded composition of this invention is non-tacky, does not block and has greater clarity than film made of polyethylene alone. The other physical properties of the film of this invention compare very favorably with film formed of polyethylene alone. Surprisingly, film produced of the compounded composition of this invention has a greater clarity than film formed of polyethylene compounded with either di-2 ethyl hexyl phthalate or No. 1 yellow double refined carnauba wax alone.

As previously mentioned, optimum film clarity is obtained when the film is obtained from a compounded composition. A film produced from a composition prepared without compounding, such as by merely mechanical mixing of the components and without heating the polyethylene to at least its melting point, will not possess the clarity which characterizes a film made from the compounded composition.

Herein the expression "compounded composition" or equivalent terminology is intended to cover a homogenous composition obtained by intimately blending and incorporating the additives with polyethylene on a conventional rubber mill, Banbury mixer, or the like whereby the polyethylene is heated to at least its melting point during the blending operation.

Since it is obvious that various changes and modifications can be made in the above description without departing from the nature or spirit thereof, this invention is not restricted thereto except as set forth in the appended claims.

I claim:

1. A film-forming composition consisting essentially of 100 parts of polyethylene compounded at at least its melting point with ½ to 3 parts of di-2 ethyl hexyl phthalate and ½ to 3 parts carnauba wax, the parts being by weight.

2. A film-forming composition consisting essentially of 100 parts of polyethylene compounded at at least its melting point with 2 parts of di-2 ethyl hexyl phthalate and 2 parts of carnauba wax, the proportions being by weight.

3. A self-sustaining film of improved clarity formed of a composition consisting essentially of 100 parts of polyethylene compounded at at least its melting point with ½ to 3 parts of di-2 ethyl hexyl phthalate and ½ to 3 parts of carnauba wax, the proportions being by weight.

4. A self-sustaining film of improved clarity formed of a composition consisting essentially of 100 parts of polyethylene compounded at at least its melting point with 2 parts of di-2 ethyl hexyl phthalate and 2 parts carnauba wax, the proportions being by weight.

EDWARD D. FULLER.

REFERENCES CITED

The following references are of record in the file of this patent:

UNITED STATES PATENTS

| Number | Name | Date |
|---|---|---|
| 2,212,155 | Ellis | Aug. 20, 1940 |
| 2,298,846 | Skooglund | Oct. 13, 1946 |

OTHER REFERENCES

Modern Plastics, "Plasticizing with ethyl hexyl phthalate," Nov. 1945, pages 169, 170 and 206.